United States Patent [19]
Davis

[11] Patent Number: 5,807,965
[45] Date of Patent: Sep. 15, 1998

[54] INTERFACIAL COPOLYESTERCARBONATE METHOD USING CATALYST COMPRISING HEXAALKYLGUANIDINIUM SALT AND TERTIARY AMINE

[75] Inventor: Gary Charles Davis, Albany, N.Y.

[73] Assignee: General Electric Company, Schenectady, N.Y.

[21] Appl. No.: 996,897

[22] Filed: Dec. 23, 1997

[51] Int. Cl.$^6$ ..................................................... C08G 64/00
[52] U.S. Cl. ......................... 528/196; 528/176; 528/179; 528/182; 528/198; 528/199; 528/202
[58] Field of Search .................................... 528/176, 179, 528/182, 196, 198, 199, 202

[56] References Cited

U.S. PATENT DOCUMENTS 5,274,068  12/1993  Boden et al. ............................ 528/179
5,510,449  4/1996  Flowers et al. .......................... 528/199
5,519,105  5/1996  Boden et al. ............................ 528/199

*Primary Examiner*—Terressa Mosley
*Attorney, Agent, or Firm*—Noreen C. Johnson; Douglas E. Stoner

[57] ABSTRACT

The level of anhydride linkages in copolyestercarbonates is decreased by preparing the copolyestercarbonate interfacially in a two-step method from at least one dihydroxyaromatic compound and at least one dicarboxylic acid. The first step is conducted at a pH in the range of about 4.5–9.5, employing the combination of a hexaalkylguanidinium salt as a phase transfer catalyst and a tertiary amine such as triethylamine. The proportion of the phase transfer catalyst and tertiary amine are usually in the range of about 1–5 and about 0.01–5.0 mole percent, respectively, based on total dihydroxyaromatic compound and dicarboxylic acid employed. In the second phosgenation step, the pH is raised to at least 10 and a stoichiometric phosgene excess of at least 5% is introduced.

20 Claims, No Drawings

INTERFACIAL COPOLYESTERCARBONATE METHOD USING CATALYST COMPRISING HEXAALKYLGUANIDINIUM SALT AND TERTIARY AMINE

BACKGROUND OF THE INVENTION

This invention relates to the preparation of copolyestercarbonates, and more particularly to an improved method for their preparation by interfacial methods.

The preparation of copolyestercarbonates by the interfacially conducted condensation of dihydroxyaromatic compounds with dicarboxylic acids and phosgene in an immiscible aqueous-organic medium is known. It ordinarily takes place in the presence of a tertiary amine, a phase transfer catalyst or both. The product copolyestercarbonates have properties similar to those of polycarbonates but are generally more ductile, especially when the ester units are derived from aliphatic acids.

Among the uses presently under study for copolyestercarbonates is in optical disk fabrication. For this purpose, it is frequently advantageous to incorporate structural units which have very low or even negative intrinsic birefringence, such as those derived from spiro(bis)indane bisphenols and especially 6,6'-dihydroxy-3,3,3',3'-tetramethyl-1,1'-spiro(bis)indane, hereinafter designated "SBI". When SBI units are present in polycarbonates, however, they are very brittle, processing is difficult and it is almost essential to improve ductility by incorporation of ester units.

The interfacial preparation of copolyestercarbonates is also known. In this method of preparation, reaction is conducted between phosgene and a mixture of a dihydroxyaromatic compound and a dicarboxylic acid (or corresponding acid chloride) in an immiscible aqueous-organic mixture. The reaction takes place under alkaline conditions and in the presence of a catalyst, typically a tertiary amine, phase transfer catalyst or combination of the two.

The polymer ideally produced by this method contains ester and polycarbonate units. It is often found, however, that said polymer also contains moieties incorporating anhydride linkages, which are thermally and hydrolytically unstable.

It is frequently found that anhydride linkages are produced in substantial proportions under normal interfacial reaction conditions. The presence of such linkages can often be minimized by careful control of the pH of the reaction mixture. This has not been found to be true, however, when a large proportion of acid-derived groups, for example 10 mole percent or higher, is desired in the polymer.

U.S. Pat. Nos. 5,510,449 and 5,519,105 describe procedures for the preparation of polycarbonates, including copolyestercarbonates, in which a mixture of phase transfer catalyst and tertiary amine is employed. There is no suggestion, however, of a method for decreasing the proportion of anhydride linkages in a copolyestercarbonate.

Therefore, it is of interest to adjust the reaction conditions in interfacial copolyestercarbonate preparation to suppress the formation of anhydride linkages, particularly when large percentages of ester groups are desired in the polymer.

SUMMARY OF THE INVENTION

The present invention provides a method for producing copolyestercarbonates interfacially which minimizes the formation of anhydride linkages. This is done easily by a suitable choice of catalytic species and phosgenation conditions, and is effective even for the incorporation of ester groups in large proportions.

The invention is a method for preparing a copolyestercarbonate which comprises:

passing phosgene, under reactive conditions including a pH in the range of about 4.5–9.5, into the constituents of a mixture comprising at least one dihydroxyaromatic compound, at least one dicarboxylic acid, at least one hexaalkylguanidinium salt as a phase transfer catalyst, at least one tertiary amine, water and a water-immiscible organic solvent, the proportion of phosgene being at least about 50% of stoichiometric; and raising the pH to at least about 10 and continuing phosgene passage until a stoichiometric excess of at least 5% phosgene by weight has been introduced.

DETAILED DESCRIPTION; PREFERRED EMBODIMENTS

The dihydroxyaromatic compounds employed in the method of this invention typically have the formula $$HO-A^1-OH, \qquad (I)$$

wherein $A^1$ is an aromatic organic radical. At least a portion of total dihydroxyaromatic compounds employed are generally those in which $A^1$ has the formula $$-A^2-Y-A^3-, \qquad (II)$$

wherein each of $A^2$ and $A^3$ is a monocyclic divalent aryl radical and Y is a single bond or a bridging radical in which one or two carbon atoms separate $A^2$ and $A^3$.

The $A^2$ and $A^3$ radicals are most often unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred bisphenol is 2,2-bis(4-hydroxyphenyl)pro-pane, also known as "bisphenol A".

It is also frequently preferred to employ a mixture of dihydroxyaromatic compounds, at least one of which is a spiro(bis)indane bisphenol as illustrated by SBI and its 5,5'-dihydroxy isomer. SBI is usually preferred by reason of its particular effectiveness and relative ease of preparation.

The term "bisphenol" will frequently be used hereinafter to designate the preferred dihydroxyaromatic compounds which are usually spiro(bis)indane bisphenols and those having formula I. However, it should be understood that other dihydroxyaromatic compounds can be substituted therefor when appropriate.

The dicarboxylic acid may be aliphatic or aromatic. Illustrative aromatic acids are terephthalic and isophthalic acid. Typical aliphatic acids include those containing 4–25 carbon atoms, including adipic acid, azelaic acid, suberic acid and 1,12-dodecane —dicarboxylic acid. The aliphatic dicarboxylic acids are generally preferred by reason of their excellent ductility improving properties, with the $C_{6-20}$ acids being more preferred and sebacic and 1,12-dodecanedioic acid being most preferred.

The phase transfer catalyst employed in the method of this invention is at least one hexaalkylguanidinium salt. Illustrative hexaalkylguanidinium salts are hexaethylguanidinium chloride, hexaethylguanidinium bromide and the quaternary bisphenolates (e.g., compounds containing one hexaalkylguanidinium cation, three protons and one divalent bisphenolate anion) disclosed in copending, commonly owned application Ser. No. 08/768,871 U.S Pat. No. 5,757,843.

Suitable aliphatic and alicyclic tertiary amines include those having about 5–20 carbon atoms. Examples are triethylamine, tri-n-butylamine, N-methylpiperidine, 4-methylmorpholine and 4-ethylmorpholine. Triethylamine and N-methylpiperidine are often preferred.

Water-immiscible organic solvents which may be employed in the method of the invention include chlorinated aliphatic hydrocarbons, such as methylene chloride, chloroform, dichloroethane, trichloroethane, tetrachloroethane, dichloropropane and 1,2-dichloroethylene, and substituted aromatic hydrocarbons such as chlorobenzene, o-dichlorobenzene and the various chloro toluenes. The chlorinated aliphatic hydrocarbons are preferred, with methylene chloride being most preferred.

Endcapping agents may also be present in the reaction mixture. They are typically phenols as exemplified by phenol, p-cresol and cumylphenol.

In the first step of the method of this invention, phosgene is passed into a mixture of the bisphenol, dicarboxylic acid, phase transfer catalyst, tertiary amine, water and organic solvent. The proportions of water and organic solvent are not critical but are typically reflected in a volume ratio of aqueous to organic phase in the range of about 0.2–1.1:1. Reaction temperatures are generally in the range of about 15°–50° C., preferably about 35°–45° C.

The proportion of tertiary amine employed is not critical. Illustrative proportions are in the range of about 0.01–5.0 mole percent based on total bisphenol and dicarboxylic acid. For the most part, lesser quantities of N-alkyl heterocyclic compounds such as N-methylpiperidine than of aliphatic tertiary amines are necessary.

It is strongly preferred that the tertiary amine be present in combination with the phase transfer catalyst during the entire course of the first step. If the phase transfer catalyst alone is present when the reaction is initiated and the tertiary amine is added later, anhydride levels in the product may increase.

The proportion of phase transfer catalyst is also not critical. In general, however, it is found that the proportion of anhydride linkages in the product decreases with an increase in the amount of phase transfer catalyst. The amount employed is often in the range of about 1–5 mole percent.

The pH of the reaction mixture is maintained in the range of about 4.5–9.5 and preferably about 6.5–9.0 during the first step of phosgene addition, typically by the addition of aqueous alkali such as sodium hydroxide or potassium hydroxide to neutralize hydrochloric acid formed upon reaction of the phosgene. As used herein, pH designates that of the aqueous phase of the reaction mixture. Phosgene addition is continued in the first step until at least about 50% and preferably about 75–90% by weight of the stoichiometric amount has been added.

When the required amount of phosgene has been added in the first step, the pH of the reaction mixture is raised to at least about 10, preferably about 10–11, by the addition of further alkali. Phosgene addition is then continued until the total amount of phosgene added is as least 5% and preferably about 10–25% by weight in excess of the stoichio metric amount.

When the reaction is complete, the copolyestercarbonate may be isolated by conventional means. These typically include separation of the organic and aqueous phases, washing of the organic phase with aqueous acid and/or water and precipitation of the polymer by pouring into boiling water, by steam precipitation or by combination with a non-solvent such as methanol.

The copolyestercarbonates prepared by the method of this invention have been found to contain much lower proportions of anhydride linkages than those prepared by other methods. This decrease in the level of anhydride linkages appears to be principally attributable to the presence of the hexaalkylguanidinium salt.

The level of anhydride linkages in the product may be determined by carbon-13 nuclear magnetic resonance spectroscopy. It may also be determined by proton nuclear magnet resonance spectroscopy except when SBI units are present, since the chemical shifts of some of the protons in said units cause interference with those of the protons characteristic of anhydride linkages.

The invention is illustrated by the following examples.

EXAMPLES 1–5

A series of 500-ml Morton flasks was charged with 9.6 g (31.3 mmol) of SBI, 5.0 g (21.9 mmol) of bisphenol A, 2.2 g (9.4 mmol) of 1,12-dodecanedioic acid, 250 mg (1.17 mmol) of p-cumylphenol, 120 ml of methylene chloride, 50 ml of distilled water, and various quantities of tertiary amine and hexaethylguanidinium bromide (1.75 mole percent based on bisphenols and dicarboxylic acid). Phosgene was passed into the mixtures, with stirring, at 0.25 g/min, with maintenance of the pH at 8 (Examples 1–4 and Controls 1–4) or 9 (Example 5 and Control 5) by addition of 25% aqueous sodium hydroxide solution. When 85 mole percent of the stoichiometric amount of phosgene had been added, the pH was raised to 10.5 and phosgene addition was continued until a 20 mole percent excess had been introduced.

The organic and aqueous phases were separated and the organic phase was washed with aqueous hydrochloric acid solution and 4 times with distilled water. The copolyestercarbonates were precipitated by pouring the methylene chloride solution into boiling water in a blender, and were separated by filtration, washed with water and dried at 120° C. under vacuum.

The results are given in the following table, in comparison with several controls. The following abbreviations for amines and phase transfer catalysts are employed:

HEGBr—hexaethylguanidinium bromide,
HEGBPA—hexaethylguanidinium trihydrogen salt of bisphenol A,
MTBA—methyltri-n-butylammonium bromide,
BTMA—benzyltrimethylammonium chloride,
NMPP—N-methylpiperidine,
TEA—triethylamine.

|  | Phase transfer cat. | | Tertiary amine | | Anhydride |
|---|---|---|---|---|---|
| Example | Identity | Mole % | Identity | Mole % | linkages, % |
| 1 | HEGBr | 3.5 | TEA | 1.6 | 0.8 |
| 2 | HEGBPA | 3.5 | TEA | 1.6 | 0.8 |
| 3 | HEGBr | 1.75 | TEA | 1.6 | 1.4 |
| 4 | HEGBr | 1.75 | NMPP | 0.03 | <0.5 |
| 5 | HEGBPA | 3.5 | TEA | 1.6 | 0 |
| Control 1 | MTBA | 3.5 | TEA | 1.6 | 4.0 |
| Control 2 | BTMA | 3.5 | TEA | 1.6 | 2.2 |
| Control 3 | MTBA | 1.75 | TEA | 1.6 | 2.3 |
| Control 4 | MTBA | 1.75 | NMPP | 0.03 | <0.5 |
| Control 5 | MTBA | 3.5 | TEA | 1.6 | 4.0 |

It is apparent that the level of anhydride linkages in Examples 1–4 was significantly lower than in the corresponding Controls 1–4. In Example 5 and Control 5, the anhydride analysis method was not adequate to discern a difference. However, it is believed that a difference would be observed at lower levels of phase transfer catalyst and/or tertiary amine.

What is claimed is:

1. A method for preparing a copolyestercarbonate which comprises:

passing phosgene, under reactive conditions including a pH in the range of about 4.5–9.5, into the constituents of a mixture comprising at least one dihydroxyaromatic compound, at least one dicarboxylic acid, at least one hexaalkylguanidinium salt as a phase transfer catalyst, at least one tertiary amine, water and a water-immiscible organic solvent, the proportion of phosgene being at least about 50% of stoichiometric; and raising the pH to at least about 10 and continuing phosgene passage until a stoichiometric excess of at least 5% phosgene by weight has been introduced.

2. A method according to claim 1 wherein the dihydroxyaromatic compound is bisphenol A.

3. A method according to claim 1 wherein the dihydroxyaromatic compound is a mixture of bisphenol A and 6,6'-dihydroxy-3,3,3',3'-tetramethyl-1,1'-spiro(bis)indane.

4. A method according to claim 1 wherein the dicarboxylic acid is an aliphatic dicarboxylic acid.

5. A method according to claim 4 wherein the dicarboxylic acid is sebacic acid or 1,12-dodecanedioic acid.

6. A method according to claim 1 wherein the organic solvent is a chlorinated aliphatic hydrocarbon.

7. A method according to claim 6 wherein the organic solvent is methylene chloride.

8. A method according to claim 1, wherein the tertiary amine is triethylamine or N-methylpiperidine.

9. A method according to claim 1 wherein the phase transfer catalyst is hexaethylguanidinium chloride.

10. A method according to claim 1 wherein the phase transfer catalyst is hexaethylguanidinium bromide.

11. A method according to claim 1 wherein the phase transfer catalyst is the hexaethylguanidinium trihydrogen salt of bisphenol A.

12. A method according to claim 1 wherein the proportion of phase transfer catalyst is in the range of about 1–5 mole percent.

13. A method according to claim 1 wherein the proportion of tertiary amine is in the range of about 0.01–5.0 mole percent.

14. A method according to claim 1 wherein the pH is maintained in the range of about 6.5–9.5 during the first step.

15. A method according to claim 1 wherein phosgene addition in the first step is continued until about 75–90% by weight of the stoichiometric amount has been added.

16. A method according to claim 1 in which the pH in the second step is in the range of about 10–11.

17. A method according to claim 1 wherein the total amount of phosgene added is about 10–25% by weight in excess of the stoichiometric amount.

18. A method for preparing a copolyestercarbonate which comprises:

passing phosgene, under reactive conditions including a pH in the range of about 6.5–9.5, into a mixture comprising:

at least one dihydroxyaromatic compound selected from the group consisting of bisphenol A and a mixture of bisphenol A and 6,6'-dihydroxy-3,3,3',3'-tetramethyl-1,1'-spiro(bis)indane, at least one $C_{6-20}$ aliphatic dicarboxylic acid, water, and methylene chloride, in the presence of both at least one hexaalkylguanidinium salt as a phase transfer catalyst and at least one tertiary amine, the proportion of said hexaalkylguanidinium salt and tertiary amine being in the range of about 1–5 and 0.01–5.0 mole percent, respectively, based on total dihydroxyaromatic compound and dicarboxylic acid and the proportion of phosgene being at least about 50% by weight of stoichiometric; and raising the pH to at least about 10 and continuing phosgene passage until a stoichiometric excess of at least 5% phosgene by weight has been introduced.

19. A method according to claim 18 wherein the hexaalkylguanidinium salt is hexaethylguanidinium bromide, hexaethylguanidinium chloride or the hexaethylguanidinium trihydrogen salt of bisphenol A.

20. A method according to claim 18 wherein the tertiary amine is triethylamine or N-methylpiperidine.

* * * * *